United States Patent
Adam et al.

(10) Patent No.: US 8,551,569 B2
(45) Date of Patent: Oct. 8, 2013

(54) METHOD FOR PRODUCING A METAL BASE MATERIAL PROVIDED WITH A SLIDING LAYER, AND THE USE THEREOF

(75) Inventors: Achim Adam, Nauheim (DE); Stefan Fuchsberger, Eltville (DE); Joachim Schluter, Wiesbaden (DE)

(73) Assignee: Federal-Mogul Wiesbaden GmbH & Co. KG, Wiesbaden (DE)

( * ) Notice: Subject to any disclaimer, the term of this patent is extended or adjusted under 35 U.S.C. 154(b) by 2459 days.

(21) Appl. No.: 10/490,849

(22) PCT Filed: Sep. 24, 2002

(86) PCT No.: PCT/DE02/03607
§ 371 (c)(1),
(2), (4) Date: Sep. 16, 2004

(87) PCT Pub. No.: WO03/027522
PCT Pub. Date: Apr. 3, 2003

(65) Prior Publication Data
US 2005/0025977 A1    Feb. 3, 2005

(30) Foreign Application Priority Data
Sep. 26, 2001 (DE) ................... 101 47 292

(51) Int. Cl.
*B05D 3/02* (2006.01)
(52) U.S. Cl.
USPC ............ 427/384; 427/387; 427/333; 427/365
(58) Field of Classification Search
USPC ........... 427/388, 384, 387, 333, 365, 40, 407, 427/419
See application file for complete search history.

(56) References Cited

U.S. PATENT DOCUMENTS

| | | | | |
|---|---|---|---|---|
| 4,732,818 A | * | 3/1988 | Pratt et al. | 428/547 |
| 5,019,308 A | * | 5/1991 | Pratt et al. | 264/87 |
| 5,024,881 A | * | 6/1991 | Matucha et al. | 428/323 |
| 5,312,576 A | * | 5/1994 | Swei et al. | 264/112 |
| 5,642,991 A | * | 7/1997 | Singleterry et al. | 418/104 |
| 5,708,089 A | | 1/1998 | Scheckenbach et al. | |
| 6,077,815 A | * | 6/2000 | Grunthaler et al. | 508/108 |
| 6,376,061 B1 | * | 4/2002 | Adam | 428/327 |
| 6,528,143 B1 | * | 3/2003 | Adam et al. | 428/141 |

FOREIGN PATENT DOCUMENTS

| | | |
|---|---|---|
| DE | 36 18 786 A1 | 12/1987 |
| DE | 4227909 A1 | 2/1994 |
| DE | 19808540 A1 | 9/1999 |
| EP | 0470446 | * 12/1992 |
| EP | 0 877 867 B1 | 11/1998 |
| JP | 58144440 | 8/1983 |
| JP | 60-47415 | 2/1985 |

OTHER PUBLICATIONS

Technische Thermoplaste, Hochleistungs-Kunststoffe Polyarylate, Kunststoff Handbuch 3/3, Herausgegeben von Dr. Ludwig Bottenbruch, Mit 241 Bildern und 162 Tabellen.

* cited by examiner

*Primary Examiner* — Nadine G Norton
*Assistant Examiner* — Maki Angadi
(74) *Attorney, Agent, or Firm* — Robert L. Stearns; Dickinson Wright, PLLC

(57) ABSTRACT

The invention relates to a method for producing a metal base material that is provided with a sliding layer that has a thickness of more then 50 μm, said base material being used as a sliding element. According to the invention, the base material is coated with a paste of the sliding layer material that contains at least one high-temperature polymer in addition to a fluoropolymer, and the base material so coated is subjected to a thermal treatment. The past applied to the base material contains as the fluoropolymer between 40% by volume and 75% by volume polytetrafluorethylene (PTFE) or polytetrafluorethylene (PTFE) with other fluoropolymers added and between 60% by volume and 25% by volume of the at least one high-temperature polymer, each based on the entire composition of the finished sliding layer. The high-temperature polymer used is selected from those high-temperature polymers whose melting pint is not below 327° C., if they are mainly crystalline, or whose glass transition temperature is not below 327° C., if they are mainly amorphous.

21 Claims, No Drawings

METHOD FOR PRODUCING A METAL BASE MATERIAL PROVIDED WITH A SLIDING LAYER, AND THE USE THEREOF

BACKGROUND OF THE INVENTION

1. Technical Field

The present invention relates to a method of producing a metallic backing material provided with an overlay, having the features of the precharacterizing clause of claim 1, together with the use of such coated backing materials.

2. Related Art

Metallic backing materials provided with a plastics overlay are known which may be used to produce sliding or bearing elements, such as bushes, half-shells, sliding rails or sliding plates, whether unlubricated or with additional oil or grease lubrication.

As a rule, composite materials with a plastics overlay are used for such sliding elements, which materials consist of a metallic backing framework, preferably of steel, bronze or a high-strength aluminum alloy, which takes the form of a sintered porous surface layer or of a fabric, and a continuous plastics layer applied to the metal framework in such a way that the spaces in the framework structure are completely filled with the plastics materials. Materials without a framework structure are also known, in which a plastics film is adhered to a smooth backing material.

In principle, there are two significant embodiments of sliding materials, which differ from one another in the matrix plastics used and the associated different modes of operation. The materials are based on the one hand on polytetrafluoroethylene and on the other hand on thermoplastics.

Thermoplastic-based materials, such as for example POM, PVDF or PA, belong to the prior art. These operate differently from polytetrafluoroethylene materials. In the case of thermoplastic-based materials, the layer thickness is generally greater than 50 µm, wherein the metallic backing framework is not involved in the sliding process but merely serves as a mechanical anchor for the thermoplastic. However, such materials have different properties from polytetrafluoroethylene materials, both from a positive and from a negative point of view. For instance, these thermoplastic materials have higher coefficients of friction in the case of oil lubrication, which is a particular disadvantage for hydraulic applications, and poorer plasticity, whereby for example it is difficult or impossible to produce flanged bushes or bushes without metal backing, while post-machining, for example drilling in the installed state to compensate housing tolerances, is possible, together with a relatively high load-carrying capacity and wear resistance.

Polytetrafluoroethylene-based materials are substantially softer and their functionality is therefore generally based, in the absence of lubricants and under appreciable load, for instance greater than 1 MPa, on the exposure of the metallic backing framework, such that the latter is involved in frictional contact as a surface component. In the case of such materials, when conventional plastics compositions are used it is not sensible to build up layers over 50 µm thick, since these layers cannot absorb the load without flow. On the contrary, they generally have relatively small layer thicknesses of around 20 µm, which contain precisely enough material for forming a transfer layer on the counterpart. Surplus material leads to the formation of undesired wear particles during the running-in phase and may result in undesired material displacement in the case of the generally necessary calibration processes during manufacture or during installation of the sliding elements.

These materials may be produced relatively simply, starting with a polytetrafluoroethylene dispersion with which appropriate additions are mixed and which is then converted into a homogeneous plastic blend by coagulation. The paste produced in this way is then applied by means of rolls to the strip-form preliminary material with the framework structure and finally sintered, as described for example in DE 195 06 684, a layer thickness of 0-50 µm also being indicated therein.

Materials are described in DE 198 08 540 A with which the overlay may consist of polytetrafluoroethylene with 10-50% of poly(p-phenylene terephthalamide) (PPTA), wherein the layer thicknesses of these materials are limited to 0-50 µm by rolling into the porous substrate. Toluene is used for production.

Thick polytetrafluoroethylene-based layers may also be produced, but using a comparatively expensive and complicated method. This known method firstly requires the production of a film of the respective material, which has then to be applied to the backing material. In comparison to the layers of the same composition produced by the paste method, these films generally exhibit better mechanical properties and higher wear resistance, since they are peeled off blocks which have been sintered under more effective conditions than is the case when sintering overlays in a tunnel oven. The films may be stuck on as a smooth backing material or applied without adhesive to a heated, porous backing framework.

However, it is deemed a disadvantage that first of all it is always necessary to perform additional operations, namely production of the sintered block and peeling of the film. If it is also necessary to use an adhesive, the film has additionally to be etched with a solution of sodium in ammonia or with sodium naphthyl, which is problematic from an environmental and safety point of view. Sticking the film on by means of an adhesive is likewise problematic, since fluorinated high temperature adhesives are used, wherein heating and cooling have to be performed while the pressing pressure is maintained. In any case, adhesive strength is limited, such that the layer may easily become detached especially at cut edges.

Additional prior art which should be mentioned is DE 44 30 474, which discloses a method in which a film consisting mainly of thermoplastics is incorporated into a porous substrate, and EP 0 877 867, which describes the production of a thermoplastic layer by sprinkling on a powder, followed by melting and rolling smooth. Thermoplastic layers have hitherto had a greater load-carrying capacity then polytetrafluoroethylene layers and may therefore be thicker and, if necessary, also post-machined. U.S. Pat. No. 5,019,308 proposes a method of producing relatively thick layers, in which a blend of polytetrafluoroethylene and fillers is firstly applied to a plastics film and pre-dried, in order then to be transferred in a next method step to the metallic substrate material proper. However, this method is involved and thus cost-intensive, since it requires an additional process step and, moreover, the indicated compositions do not produce strong layers.

SUMMARY OF THE INVENTION AND ADVANTAGES

The object of the present invention is to provide a method of producing a metallic backing material provided with an overlay, with which sliding elements with a strong overlay more than 50 µm thick and based on polytetrafluoroethylene may be produced which exhibit a sufficiently long service life and thus comprise a wear-resistant overlay which may be post-machined if required.

This object is achieved according to the invention by a method having the characterizing features of claim 1.

The method according to the invention of producing a backing material provided with an overlay, which material is used as a sliding element, is characterized in that the backing material is coated with a paste of overlay material, which contains in addition to a polytetrafluoroethylene-based fluoropolymer also at least one high temperature polymer. The backing material coated in this way is then subjected to heat treatment. With the method according to the invention, a paste is applied to the backing material which comprises as fluoropolymer between 40 vol. % and 75 vol. % of polytetrafluoroethylene (PTFE) or polytetrafluoroethylene (PTFE) with additions of other fluoropolymers and between 60 vol. % and 25 vol. % of the at least one high temperature polymer; wherein the concentrations indicated above relate to the total composition of the finished overlay. The high temperature polymers used have a melting point which is not less than 327° C., if they are predominantly crystalline, or a glass transition temperature of not less than 327° C., if they are predominantly amorphous. By selecting the components according to the invention in the proportions according to the invention, it has become possible to produce overlays more than 50 μm thick by means of a paste.

Thus, the above-described method according to the invention differs from the prior art in that the sliding element produced in this way exhibits an overlay thickness which is greater than 50 μm, wherein the overlay comprises a special composition with regard to its polymer matrix, to the effect that this polymer matrix comprises as fluoropolymer 40 vol. % to 75 vol. % of the polytetrafluoroethylene (PTFE) or of the polytetrafluoroethylene (PTFE) mixed with other fluoropolymers and 60 vol. % to 25 vol. % of the at least one high temperature polymer. The total quantity of PTFE should preferably be no less than 40 vol. %.

Thus, in the method according to the invention, polytetrafluoroethylene (PTFE) alone or polytetrafluoroethylene (PTFE) blended with other fluoropolymers, especially with other fluorothermoplastics, are used as the fluoropolymer, wherein the melting point of these thermoplastics is preferably above 260° C.

The sliding element produced using the method according to the invention exhibits excellent properties with regard to its overlay. For instance, it should firstly be noted that an overlay produced using the method according to the invention is highly wear-resistant even with high layer thicknesses, i.e. especially with layer thicknesses which are over 50 μm and preferably range up to 500 μm, which finds expression in particular in the fact that they exhibit an extremely low rate of wear under heavy loading, preferably of between 1 MPa and 70 MPa, compared with overlays of the same thickness which were produced using conventional methods. This high level of wear resistance of the overlay produced by the method according to the invention is a result of the fact that the comparatively large proportion of firmly incorporated particles of high temperature-resistant polymers has a strengthening effect and increases the pressure and shear resistance to the extent that the overlay absorbs the loads without flow and, moreover, the added particles on the overlay surface have an abrasive wear-reducing effect.

Also in the case of the overlay produced using the method according to the invention, the mechanical anchoring achieved prevents any undesired detachment of the overlay from the metallic backing material, as is possible with the known film coating method described above.

Furthermore, the overlays produced using the method according to the invention may be post-machined, in order even to be able to produce retrospectively the exact fit necessary between the parts in frictional contact, which is impossible in the case of the polytetrafluoroethylene-based overlays produced using the known methods. The relatively large layer thickness of the overlay produced by the method according to the invention effectively prevents contact between the metallic backing material and the porous sintered framework during use of the sliding elements, which in turn results in careful treatment of the shaft surface.

Even with extremely large layer thicknesses, i.e. layer thicknesses of up to 500 μm, the overlay applied to the metallic backing material using the method according to the invention does not exhibit any flow when appropriately loaded, which frequently happens with sliding elements produced using the known methods especially in the case of relatively large layer thicknesses, such that such sliding elements are of only limited use. Another advantage which should be emphasized is that the method according to the invention, as a single stage method, is substantially less complex to perform than the known film coating method, such that the production costs of the sliding elements produced by the method according to the invention are reduced accordingly.

The method according to the invention also allows sliding elements to be produced in a particularly simple manner with different layer thicknesses conformed to respective requirements, wherein the variation options for the overlay composition are simplified, especially in comparison to the known film coating method, in that in the method according to the invention it is not necessary firstly to produce a film in a separate operating step, which is additionally partially modified by etching and moreover applied to the metallic backing material in a complex adhesion process, since, in the case of the method according to the invention, a paste of the desired composition is merely applied to the metallic backing material in the required layer thickness.

As has already been emphasized above in relation to the method according to the invention, the backing material provided with the paste in accordance with the method according to the invention comprises an overlay whose thickness ranges preferably between 51 μm and 500 μm and especially ranges between 100 μm and 300 μm. This means, with regard to the method according to the invention, that in this preferred embodiment of the method according to the invention such a quantity of pasty overlay material is applied to the backing material that the above-described overlay thicknesses are produced, wherein all the overlay thicknesses indicated here relate always to sliding elements which are ready for use. The sliding elements produced in this way exhibit an overlay of such a thickness, as specified above, that it is on the one hand highly wear-resistant and on the other it may be ensured that such sliding elements may still be appropriately machined, for example ground or drilled, to produce the necessary and desired exact fit.

A further embodiment of the method according to the invention is characterized in that a paste is applied to the backing material which comprises between 55 vol. % and 70 vol. % of polytetrafluoroethylene (PTFE) or polytetrafluoroethylene with additions of other fluoropolymers and between 45 vol. % and 30 vol. % of the at least one high temperature polymer, in each case relative to the total composition of the finished overlay. In the case of a sliding element produced in this way in particular, the above-described advantages of the sliding elements produced using the method according to the invention are especially present, i.e. a backing material, which has been coated with the above-described polymer matrix, exhibits a very high level of wear resistance even under extreme loading.

It should be emphasized in relation to the high temperature polymer used in the method according to the invention that any high temperature polymer may in principle be used provided that, in conjunction with the polytetrafluoroethylene (PTFE) or with the polytetrafluoroethylene provided with additions of other fluoropolymers, it results in the above-described thick overlays when applied in paste form to the respective backing material.

It is particularly preferable if a high temperature polymer, especially a high temperature thermoplastic, is selected for the method according to the invention whose melting point, in the case of a predominantly crystalline fraction, or whose glass transition temperature, in the case of a predominantly amorphous structure, is not below polytetrafluoroethylene (PTFE). It is assumed that it is significant, on cooling, whether the polytetrafluoroethylene (PTFE) or the high temperature polymer solidifies first.

Two effects may play a part here and thus influence a strengthening effect: the contraction in volume during phase transition results, in the case of low melting points for the high polymer, in micro-cavities and thus in a loss of strength. If, conversely, polytetrafluoroethylene (PTFE) solidifies later on cooling, the opposite is the case, namely stronger interfacial contact. Another effect results from the surface of the high polymer. Due to surface tension, the high polymers form droplets with smooth surfaces in the low-viscosity state, such that, when the polytetrafluoroethylene (PTFE) cools, interfacial contact is minimized, which leads to poorer incorporation of the high polymers in the matrix. If the high polymers solidify sooner, more favorable, less regular surfaces are again obtained, at least in the case of crystalline materials.

In the method according to the invention, pure polytetrafluoroethylene (PTFE) or a mixture of polytetrafluoroethylene (PTFE) with poly(tetrafluoroethylene-co-perfluorovinyl methyl ether) (PFA), poly(tetrafluoroethylene-co-hexafluoropropylene) (FEP), poly(hexafluoroisobutylene-covinylidene fluoride) (CM-1), poly(ethylene-alt-tetrafluoroethylene) (PTFE) and/or polyvinylidene fluoride (PVDF) is preferably used as the fluoropolymer, wherein a predominant proportion must always consist of polytetrafluoroethylene (PTFE) and the total proportion of polytetrafluoroethylene (PTFE) in the layer must not amount to less than 40 vol. %.

Proportions of up to 30 vol. % of poly(tetrafluoroethylene-co-perfluorovinyl methyl ether) (PFA) and poly(tetrafluoroethylene-co-hexafluoropropylene) (FEP), relative to the amount of fluoropolymer, have proven to be a particularly preferred composition. In other words, it is possible, in the method according to the invention, to use as the fluoropolymer both polytetrafluoroethylene (PTFE) alone or a mixture of polytetrafluoroethylene (PTFE) and the above-mentioned preferred fluoropolymers.

In order to produce long-lasting, non-flowing, relatively thick overlays on the respective metallic backing materials, a further advantageous development of the method according to the invention is characterized in that a polymer is selected as fluoropolymer which contains up to 70 vol. % of polytetrafluoroethylene and up to 30 vol. % of poly(tetrafluoroethylene-co-perfluorovinyl methyl ether) (PFA), poly(tetrafluoroethylene-co-hexafluoropropylene) (FEP), poly(hexafluoroisobutylene-covinylidene fluoride) (CM-1), poly(ethylene-alt-tetrafluoroethylene) (ETFE) and/or polyvinylidene fluoride (PVDF). These concentrations, stated above, relate to the proportion of fluoropolymer in the layer, which, as already explained above in relation to the method according to the invention, may range between 40 vol. % and 75 vol. % relative to the total composition in the total layer.

In particular, in the method according to the invention, an overlay material paste is applied to the backing material which comprises as high temperature polymer polyphenylene sulfone ($PPSO_2$), polyetherether ketone, fully aromatic polyimides, fully aromatic polyesters and/or fully aromatic polyamides, preferably poly(p-phenylene terephthalamide) (PPTA), polyaramid (TWA) and/or poly(p-benzamide) (PBA). The above-mentioned high temperature polymers may be used as desired as individual materials or as a mixture of high temperature polymers in the method according to the invention.

In order to produce the corresponding overlay material paste, which is applied to the metallic backing material, simply and reproducibly using the method according to the invention, an advantageous further development of the method according to the invention is characterized in that, to produce the paste, a polymer dispersion in an aqueous dispersing agent is used, wherein the grain size of the added high temperature polymer should range in particular between 1 and 500 µm, preferably between 5 and 250 µm.

In order to produce by the method according to the invention sliding elements whose overlays are conformed to the respective requirements, an advantageous further development of the method according to the invention is characterized in that the metallic backing material is coated with a paste which contains up to 35 vol. % of wear-reducing additions, relative to the total layer composition, wherein the concentration of polytetrafluoroethylene (PTFE) or a mixture thereof with other fluoropolymers and especially the concentration of polytetrafluoroethylene (PTFE) should not fall below 40 vol. % relative to the total layer composition. In other words, therefore, with this embodiment of the method according to the invention an overlay material paste is applied to the metallic backing material which ensures that the layer produced therefrom contains at least 40 vol. % of the fluoropolymer (PTFE or mixture with other fluoropolymers), up to a maximum of 35 vol. % of wear-reducing additions and at least 25 vol. % of the at least one high temperature polymer, wherein, by varying the above-mentioned at least three constituents, the properties of the overlay of a sliding element produced in this way may be adjusted without difficulty and reproducibly.

In the case of the method according to the invention, a paste is especially applied as paste to the backing material which contains as wear-reducing additions metal sulfides, preferably molybdenum sulfide and/or tungsten sulfide, graphite, boron nitride, preferably hexagonal boron nitride, iron (III) oxide, barium sulfate and/or carbon fibers. By admixing the respectively selected wear-reducing addition and by concentrating it to yield the paste according to the invention and by adjusting the proportions of fluoropolymers and of the at least one high temperature polymer, it is possible to vary in simple manner the respectively desired properties, especially wear resistance, flow behavior, i.e. the self-supporting properties, under load and the subsequent machinability of a sliding element produced in this way, wherein the thickness of the overlay, which may likewise be particularly simply adjusted using the method according to the invention, further potentiates the possibilities of adapting the sliding element thus produced to the respective requirements.

A metallic backing material has been repeatedly mentioned above, with reference to the method according to the invention, which is coated, in the case of the method according to the invention, with the paste in an overlay layer thickness of greater than 50 µm and preferably with an overlay thickness of between 51 µm and 500 µm and in particular with an overlay thickness of between 100 µm and 300 µm. For this purpose, in the case of the method according to the invention a roughened or porous strip of steel, bronze, brass, aluminum and/or an aluminum alloy, a composite material of steel and a porous layer of bronze, brass, aluminum and/or an aluminum alloy or in particular a fabric of steel, bronze, brass, aluminum or an aluminum alloy is coated with the above-described paste, preferably on one side, wherein these metallic backing materials preferably comprise a porous or roughened surface, into which the paste preferably penetrates during coating.

This penetration by the paste into the porous or roughened surface of the backing material contributes crucially to the fact that the overlays produced on the backing material by the method according to the invention, whose thickness is substantially greater than the known overlays, adhere without difficulty to the backing material, such that it has not been possible to observe with the sliding elements produced by the method according to the invention the above-described detachment of the overlay from the backing material, as may occur in particular with the known film coating methods.

In order to produce the paste necessary for the method according to the invention, with which the metallic backing material is coated, the method according to the invention is characterized in that the paste is produced by coagulating an aqueous, surfactant-containing dispersion of a fluoropolymer and a high temperature polymer and optionally the wear-reducing additions. In particular, coagulation of this dispersion is effected by the addition of a suitable salt with stirring, wherein, after coagulation, surplus water or surfactant solution is optionally removed until the desired viscosity of the paste produced in this way is achieved.

In order to simplify the above-described penetration of the paste into the porous surface of the metallic backing material during the coating process, a paste is produced in a further development of the method according to the invention to which one or more surfactants have additionally been added and/or which contains between 30 wt. % and 70 wt. %, preferably between 40 wt. % and 60 wt. % of water, in each case relative to the weight of the paste to be applied. By varying the water concentration within the above-mentioned limits, the viscosity of the paste may be conformed to the respective structure of the metallic backing material, such that it is ensured that, in the method according to the invention, the paste also penetrates into the porous or roughened surface of the metallic backing material and is readily anchored there during the subsequent heat treatment, such that adhesion of an overlay produced in this way to the metallic backing material is also ensured without difficulty. In principle, it should be emphasized with regard to the above-mentioned water concentration in the paste that, as the layer thickness increases, the water concentration is preferably reduced, such that, especially to produce overlays with a thickness of between 51 μm and 100 μm, the associated paste comprises water concentrations especially in the range of around 70 wt. % and, in the case of the largest overlays achievable, the associated paste comprises water concentrations of less than 40 wt. %. The water contents necessary to achieve a particular layer thickness vary as a function of the type and quantity of fillers used, however.

The quantity of surfactant(s) is selected in such a way that the more is added the thinner is the desired layer thickness. Preferably, the quantity of surfactant required in total is added in one or more portions after and/or before coagulation.

The procedure is selected in such a way that account is taken of the fact that the addition of relatively large quantities of surfactant prior to addition of the precipitating agent may impair coagulation and that the addition of excessively small quantities of surfactant prior to addition of the precipitating agent may lead to irreversible solidification of the paste and thus to larger layer thicknesses than intended.

The paste may contain one or more non-ionic surfactants. The paste may contain as surfactant an alkyl polyglycol ester.

In principle, in the method according to the invention any application method may be used to coat the metallic backing material uniformly with the paste in the predetermined thickness of at least 50 μm. However, it is particularly suitable for the paste to be rolled onto the backing material, in the method according to the invention, such that on the one hand the layer thickness is thereby rendered uniform and on the other hand it is ensured that the paste also penetrates readily and uniformly into the porous surface of the backing material.

The expression porous surface of the backing material used in the present description also covers, in the case of metallic backing materials of the fabric type, the spaces which exist between the individual thread systems of the fabric, wherein preferably such a fabric-type metallic backing material is coated with the above-described paste using a method such as is described in German patent application (Attorney's reference: F 1768) filed on the same date and/or German patent application (Attorney's reference: F 1769) filed on the same date.

As already stated in connection with the method according to the invention, after coating of the metallic backing material with the above-described paste, which contains the at least one polytetrafluoroethylene (PTFE), alone or with the addition of other fluoropolymers, and the at least one high temperature polymer in the above-mentioned quantities, heat treatment is performed, wherein this heat treatment of the backing material coated with the paste is performed at a temperature preferably between 360° C. and 420° C. for a residence time preferably of between 2 minutes and 3 minutes. This heat treatment ensures that the applied polymer matrix, which forms the overlay in the finished sliding element, is sintered and attains the greatest possible strength.

In order, in the case of particularly large overlay thicknesses, i.e. in the case of the application of large amounts of paste, to prevent the overlay formed during heat treatment from becoming undesirably cracked or pored during said treatment and thus suffering a degree of pre-damage, an advantageous further development of the method according to the invention is characterized in that the backing material coated with the paste is dried under relatively mild conditions, for instance in particular at temperatures of around 100° C. to 160° C.

In order, moreover, to ensure the mechanical properties, especially the wear resistance and self-supporting properties of the thick overlays produced by the method according to the invention, in an advantageous further development of the method according to the invention the heat-treated and thus sintered overlay is subjected to compaction and in particular hot compaction, preferably by rolling. For compaction, the rolling forces should be selected such that the thickness of the plastics layer is reduced above the porous or roughened base structure by no more than 10%, since otherwise the bond with the base structure may be damaged. In other words, with this embodiment of the method according to the invention, the backing material provided with the sintered overlay is guided immediately after heat treatment through a nip formed by a roll pair, wherein the temperature during the preferred hot compaction is just above the melting point of the polytetrafluoroethylene (PTFE) and thus just above 327° C.

As has already been stated above, the material for sliding elements produced by the method according to the invention, the overlay thickness of which is greater than 50 μm and preferably ranges between 51 μm and 500 μm and in particular between 100 μm and 300 μm, is used in plain bearings, bushes, shock absorbers or pumps, wherein such sliding elements may be used both with oil lubrication and in the unlubricated state.

DETAILED DESCRIPTION

The method according to the invention is explained in more detail below with reference to practical examples.

General Production Procedure for Sliding Elements

First of all, the volumetric proportions of the additions indicated below in the individual practical examples were suspended together with the high temperature polymer homogeneously in water with the aid of a non-ionic wetting agent. A 30% polytetrafluoroethylene dispersion was then added and further homogeneous mixing was performed. Once homogenization was complete, coagulation of the dispersion produced in this way was performed with the aid of an aluminum nitrate solution.

Once the surplus water had been removed from this coagulate until the desired consistency, suitable for coating, of the overlay composition thus produced was reached, the paste thus produced was rolled onto a backing material consisting of a porous bronze framework arranged in a steel strip, in such a quantity that different overlays were produced. Pre-drying was then performed, such that the coated backing material was then subjected to heat treatment between 380° C. and 400° C. for 120 seconds to sinter the respective polymer matrix. Immediately after the sintering process, the overall structure was hot-compacted by rolling.

The sliding elements produced in this way were investigated for wear using a pin-on-roll testing arrangement. A round test specimen 10 mm in diameter was pressed with a defined force onto a rotating roll 100 mm in diameter. The test specimen was preshaped in such a way that it fitted closely against the surface of the roll. The specific load amounted to 17.5 MPa, wherein the roll was conveyed at a speed of 0.52 m/s. The roll roughness Rz amounted to approximately 0.8 μm.

The reduction in thickness (wear rate) was measured in μm per hour of measuring time and the results are given in Table 1.

Practical Example 1

A paste was produced for a layer, which contained 60 vol. % of polytetrafluoroethylene (PTFE) and 40 vol. % of a fully aromatic polyimide (P84).

To produce this paste, 40 g of the polyimide powder was dispersed in 200 g of water, with the addition of 0.15 g of alkyl polyglycol ether and 0.4 g of sodium lauryl sulfate, for 180 seconds by means of an Ultraturrax apparatus. 300 g of a 30 wt. % polytetrafluoroethylene dispersion was then added and further stirring was performed for 45 seconds with a dissolver disk, whereupon the mixture was mixed with 5 ml of 1 molar aluminum nitrate solution, to trigger coagulation. After a further stirring period of 60 seconds, the water content of the paste produced was adjusted to 53 wt. % by draining off the gradually released liquid.

This paste was then applied to the above-described backing material, sintered and post-rolled, wherein the resultant layer thickness of the overlay amounted to 250 μm.

Practical Example 2

The constituents mentioned above under Practical Example 1 were used to produce a second paste, wherein first of all 26.6 g of a polyimide powder, 140 g of water, 0.25 g of alkyl polyglycol ether and 0.2 g of sodium lauryl sulfate were pre-dispersed for 120 seconds by means of an Ultraturrax apparatus. 200 g of a 30 wt. % polytetrafluoroethylene dispersion was then added and further slow stirring was performed for 45 seconds with a dissolver disk, whereupon coagulation of the mixture was triggered with 5 ml of a 1 molar aluminum nitrate solution. After a further stirring period of 60 seconds, the water content of the paste produced was adjusted to 59 wt. % by draining off the gradually released liquid. An overlay thickness of 130 μm was produced when this paste was applied to the above-described backing material.

Practical Example 3

A paste for a layer was produced, which contained 55 vol. % of polytetrafluoroethylene (PTFE), 30 vol. % of polyphenyl sulfone ($PPSO_2$) and 15 vol. % of graphite.

To produce this paste, 21.8 g of the $PPSO_2$ powder and 17.1 g of graphite were dispersed in 140 g of water, with the addition of 0.2 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 49 wt. % by draining off the gradually released liquid and 0.18 g of APGE was again incorporated.

This paste was then applied to the above-described backing material, sintered and post-rolled, wherein the resultant layer thickness of the overlay amounted to 350 μm.

Practical Example 4

A paste for a layer was produced, which contained 60 vol. % of polytetrafluoroethylene (PTFE), 25 vol. % of polyaramid powder (PPTA), 10 vol. % of $MoS_2$ and 5 vol. % of carbon fibers.

To produce this paste, 16.7 g of the PPTA powder and 22.9 g of the $MoS_2$ and 4.8 g of short carbon fibers were dispersed in 140 g of water, with the addition of 0.15 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 42 wt. % by draining off the gradually released liquid and a further 0.45 g of APGE was added.

This paste was then applied to the above-described backing material, sintered and post-rolled, wherein the resultant layer thickness of the overlay amounted to 360 μm.

Practical Example 5

A paste for a layer was produced, which contained 60 vol. % of polytetrafluoroethylene (PTFE), 25 vol. % of polyaramid powder (PPTA), 10 vol. % of $MoS_2$ and 5 vol. % of carbon fibers.

To produce this paste, 16.7 g of the PPTA powder and 22.9 g of the $MoS_2$ and 4.8 g of short carbon fibers were dispersed in 140 g of water, with the addition of 0.15 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 48 wt. % by draining off the gradually released liquid and a further 0.6 g of APGE was added.

This paste was then applied to the above-described backing material, sintered and post-rolled, wherein the resultant layer thickness of the overlay amounted to 140 μm.

Practical Example 6

A paste for a layer was produced, which contained 60 vol. % of polytetrafluoroethylene (PTFE), 35 vol. % of polyetherether ketone (PEEK) and 5 vol. % of boron nitride.

To produce this paste, 21.7 of the PEEK powder and 5.5 g of the BN were dispersed in 140 g of water, with the addition of 0.15 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 57 wt. % by draining off the gradually released liquid and a further 0.25 g of APGE was added.

This paste was then applied to the above-described backing material, sintered and post-rolled, wherein the resultant layer thickness of the overlay amounted to 400 μm.

Practical Example 7

A paste for a layer was produced, which contained 70 vol. % of polytetrafluoroethylene (PTFE), 25 vol. % of polyaramid powder (PPTA) and 5 vol. % of boron nitride.

To produce this paste, 14.3 g of the PPTA powder and 4.7 g of the BN were dispersed in 140 g of water, with the addition of 0.15 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 55 wt. % by draining off the gradually released liquid.

This paste was then applied to the above-described backing material, sintered and post-rolled, wherein the resultant layer thickness of the overlay amounted to 370 μm.

Practical Example 8

A paste for a layer was produced, which contained 70 vol. % of polytetrafluoroethylene (PTFE), 25 vol. % of polyaramid (PPTA) and 5 vol. % of boron nitride.

To produce this paste, 14.3 g of the PPTA powder and 4.7 g of the BN were dispersed in 140 g of water, with the addition of 0.15 g of alkyl polyglycol ether (APGE) and 0.2 g of sodium lauryl sulfate, for 180 seconds by means of an Ultraturrax apparatus. 200 g of a 30 wt. % polytetrafluoroethylene dispersion was then added and further slow stirring was performed for 60 seconds with a dissolver disk, whereupon the mixture was mixed with 5 ml of 1 molar aluminum nitrate solution, to trigger coagulation. After a further stirring period of 60 seconds, the water content of the paste produced was adjusted to 57 wt. % by draining off the gradually released liquid and a further 0.25 g of APGE was added.

This paste was then applied to the above-described backing material, sintered and post-rolled, wherein the resultant layer thickness of the overlay amounted to 150 μm.

The wear rates of the overlays produced according to Practical Examples 1 to 8 were determined as described above. The result was as follows:

TABLE 1

Wear rates for variously sliding elements

| Produced according to Practical Example | Layer thickness μm | Wear rate μm/h |
|---|---|---|
| 1 | 250 | 70 |
| 2 | 130 | 65 |
| 3 | 350 | 20 |
| 4 | 360 | 65 |
| 5 | 140 | 25 |
| 6 | 400 | 35 |
| 7 | 370 | 140 |
| 8 | 150 | 70 |

Composition No. 7 is less well suited to the high layer thickness of 370 μm. It should not therefore be used for the largest layer thicknesses.

Furthermore, 300 μm thick overlays were produced according to the method indicated in Practical Example 1 using different mixtures on the above-described backing material, and were likewise investigated with regard to their wear behavior. The results of these investigations are reproduced in the following Table 2.

TABLE 2

Wear rates of 300 μm thick overlays exhibiting different layer compositions (in each case stated in vol. %)

| | Composition | Wear rate in μm/h |
|---|---|---|
| 1 | PTFE 60 PI 40 | 60 |
| 2 | PTFE 60 PI 35 BN 5 | 40 |
| 3 | PTFE 60 PPSO$_2$ 40 | 60 |
| 4 | PTFE 65 PPSO$_2$ 35 | 25 |
| 5 | PTFE 60 PPTA 40 | 19 |
| 6 | PTFE 60 PEEK 40 | 16 |
| 7 | PTFE 60 PEEK 35 BN 5 | 37 |
| 8 | PTFE 75 PPTA 25 | 26 |
| 9 | PTFE 70 PPTA BN 5 | 62 |
| 10 | PTFE 65 PPSO$_2$ 30 BN 5 | 15 |
| 11 | PTFE 55 PPSO$_2$ 30 Graphite 15 | 18 |
| 12 | PTFE 60 PPTA 2.5 MoS$_2$ 10 Carbon fibers 5 | 30 |
| 13 | PTFE 60 PAI 40 | 170 |
| 14 | PTFE 60 PES 40 | 200 |
| 15 | PTFE 60 PPS 40 | 360 |
| 16 | PTFE 80 Pb 20 (max. 150 μm) | 120 |
| 17 | PTFE/Graphite 30, adhered film (prior art) | 230 |
| 18 | Commercially available PTFE/Bronze fabric (approx. 60 μm) (prior art) | 80 |

Example Nos. 13 to 15 show that compositions which deviate from the invention with regard to the melting points or glass transition temperatures of the high temperature plastics used exhibit markedly worse wear rates. Example No. 16 is a common composition, which again does not produce any usable results at larger layer thicknesses.

In order to determine the maximum load-carrying capacity of a sliding element produced according to the method claimed herein, in comparison to a commercially available sliding element, test bushes were produced from both sliding elements. The internal diameter of these bushes amounted to 22 mm, the length to 15 mm. The bushes were tested and loaded using a steel shaft of the roughness Rz 0.8 µm rotating at 0.125 m/s. The maximum load-carrying capacity was defined as the highest load for which a service life of 50 hours was achieved for the associated bushes.

The results of this measurement are reproduced in Table 3.

TABLE 3

| Maximum load-carrying capacity for a service life of 50 hours | |
| --- | --- |
| Sliding element 1 | 30 MPa |
| Sliding element 2 | 7 MPa |

Sliding element 1 consisted of a commercially available bronze fabric as backing material, which was coated on one side with a paste containing 65 vol. % of polytetrafluoroethylene (PTFE), 30 vol. % of polyphenylene sulfone (PPSO$_2$) and 5 vol. % of boron nitride, wherein the layer thickness of this overlay amounted to 60 µm.

Sliding element 2 consisted of a commercially available material of basically the same constriction, consisting of an identical bronze fabric coated with a film of polytetrafluoroethylene (PTFE) with a filler combination according to the prior art. Here too, the overlay thickness amounted to 60 µm.

These results are evidence of the clear advantage which may be achieved with layers produced using the method according to the invention.

The invention claimed is:

1. A method of making a sliding element, comprising:
preparing a metallic backing material of the sliding element having a roughened or porous surface;
forming an overlay on the roughened or porous backing material having a thickness greater than 50 µm by applying a paste made up of a composition of 40 to 70 vol % of a fluoropolymer material including at least PTFE and 60 to 20 vol % of at least one high temperature polymer relative to the total volume of the composition of the overlay, wherein the at least one high temperature polymer is selected to have a melting point or glass transition point of not less than 327° C., and wherein the paste is heat treated to cure and bond the overlay to the backing material and wherein the high temperature polymer is selected to comprise at least one material selected from the group consisting of: polyphenylene sulfone (PPSO$_2$), poly(p-phenylene terephthalamide) (PPTA), polyaramid (TWA) or poly (p-benzamide) (PBA).

2. A method according to claim 1, wherein the overlay is formed to a thickness of between 51 µm and 500 µm.

3. A method according to claim 1, wherein the overlay composition is selected to include 55 vol. % and 70 vol. % of the fluoropolymer material and between 45 vol. % and 30 vol. % of the at least one high temperature polymer, in each case relative to the total volume composition of the finished overlay.

4. A method according to claim 1, wherein the fluoropolymer material is selected to include at least one further material selected from the group consisting of poly(tetrafluoroethylene-co-perfluorovinyl methyl ether) (PFA), poly(tetrafluoroethylene-co-hexafluoropropylene) (FEP), poly(hexafluoroisobutylene-covinylidene fluoride) (CM-1), poly(ethylene-alt-tetrafluoroethylene) (ETFE) or polyvinylidene fluoride (PVDF).

5. A method according to claim 4, wherein the fluoropolymer material is selected to contain >40 vol. % of PTFE.

6. A method according to claim 1, wherein plastics powder of the fluoropolymer and high temperature polymer composition materials is used in making the paste having a grain size of the plastics powder of between 1 µm and the desired layer thickness.

7. A method according to claim 6, wherein the grain size of the plastics powder is selected to be between 10% and 50% of the desired layer thickness.

8. A method according to claim 1, wherein the paste is selected to include up to 35 vol. % of wear-reducing additions, relative to the total composition of the finished overlay, wherein the concentration of fluoropolymers is no less than 40 vol. % relative to the total layer composition of the finished overlay.

9. A method according to claim 1, wherein the paste is selected to include at least one metal sulfides, including molybdenum sulfide or tungsten sulfide, metal fluorides, lead, lead oxide, boron nitride, including hexagonal boron nitride, carbon modifications, including graphite, fibers, including carbon fibers, hard materials, colorants, iron (III) or barium sulfate.

10. A method according to claim 1, wherein the metallic backing material is selected from either: a roughened or porous strip of steel, bronze, brass, aluminum or aluminum alloy; or a composite material of steel and a porous or roughened layer of bronze, brass, aluminum or an aluminum alloy or a fabric of steel, bronze, brass, aluminum or an aluminum alloy.

11. A method according to claim 1, wherein the paste is produced by coagulating a mixture of an aqueous surfactant-containing polytetrafluoroethylene dispersion and at least a powder of the high temperature polymer.

12. A method according to claim 11, wherein the past mixture is selected to include between 30 wt. % and 70 wt. %, of water, relative to the weight of the paste to be applied.

13. A method according to claim 12, wherein the quantity of the surfactant or surfactants is selected in such a way that an increasing quantity is accompanied by a decreasing layer thickness.

14. A method according to claim 12, wherein the total surfactant quantity required is added in one or more portions after and/or before coagulation.

15. A method according to claim 1, wherein the paste is selected to contain one or more non-ionic surfactants.

16. A method according to claim 1, wherein the paste is selected to contain an alkyl polyglycol ester as a surfactant.

17. A method according to claim 1, wherein the paste is applied by rolling the paste onto the backing material.

18. A method according to claim 1, wherein the heat treatment of the backing material coated with the paste is performed at a temperature of between 360° C. and 420° C. for a treatment time of between 120 seconds and 180 seconds.

19. A method according to claim 1, wherein immediately after heat treatment, the coated backing material is compacted by a roll pair in such a way that the reduction in thickness of the overlay amounts to no more than 10%, relative to the thickness of the overlay prior to compaction.

20. A method according to claim 1, wherein the sliding element is made into plain bearings or slide bushes.

21. The method according to claim 1, wherein the overlay is formed to a thickness of between 100 and 300 μm.

* * * * *